United States Patent

Mizuno et al.

[11] Patent Number: 6,141,847
[45] Date of Patent: Nov. 7, 2000

[54] METHOD OF MANUFACTURING COMPOSITE ELECTRONIC COMPONENT

[75] Inventors: Masayuki Mizuno, Osaka; Masaaki Hayama, Nara; Kazuhiro Miura, Osaka; Noboru Mori, Katano; Akira Hashimoto, Takatsuki; Mitsuteru Yamada, Hirakata, all of Japan

[73] Assignee: Matsushita Electric Industrial Co., Ltd., Osaka, Japan

[21] Appl. No.: 08/997,164

[22] Filed: Dec. 23, 1997

[30] Foreign Application Priority Data

Dec. 26, 1996 [JP] Japan ..................... 8-347301

[51] Int. Cl.⁷ .................................... H01G 7/00
[52] U.S. Cl. ........................... 29/25.42; 29/602.1
[58] Field of Search ............... 29/25.42, 602.1; 361/735, 790, 792–795, 784–785; 65/43

[56] References Cited

U.S. PATENT DOCUMENTS 5,101,319  3/1992  Diffeyes et al. .................. 361/321
5,578,257  11/1996  Van Den Sype .................. 264/40.1
5,840,382  11/1998  Nishide et al. .................. 428/209

FOREIGN PATENT DOCUMENTS 5-019289    3/1993  Japan .
5-19289     3/1993  Japan .
407170041   7/1995  Japan .

Primary Examiner—Carl E. Hall
Assistant Examiner—Davide Caputo
Attorney, Agent, or Firm—McDermott, Will & Emery

[57] ABSTRACT

A ceramic substrate 1 made of magnetic substance on which an inductor 2 is formed is prepared. A ceramic substrate 3 made of dielectric substance on which a capacitor 4 is formed is also prepared. An intermediate layer 5 made of lass paste is printed on the inductor 2 and the capacitor 4. After debinding the substrates 1 and 3 independently, both the substrates are filed with the intermediate layer 5 therebetween so that both the substrates may be glued and integrated. As such, because the debinding process is provided before filing, less gas is generated in firing, and as a result, voids are restrained from occurring.

6 Claims, 3 Drawing Sheets

METHOD OF MANUFACTURING COMPOSITE ELECTRONIC COMPONENT

FIELD OF THE INVENTION

The present invention relates to a manufacturing method of a chip type solid composite component which is formed by integrating plural electronic components having different functions into one chip, e.g. a composite electronic component formed by integrating an inductor and a capacitor.

BACKGROUND OF THE INVENTION

As a conventional solid composite component, an LC composite component (L stands for inductance and C stands for capacitance.) is well known. The LC composite component is made of a multi-layer magnetic sheet having an inductor function being laminated with a multi-layer dielectric sheet having a capacitor function. A manufacturing method of this LC composite component is this:

1. Prepare a magnetic sheet by sintering a designated number of magnetic films having been laminated, where the magnetic film allows low-temperature-sintering and a coil is printed thereon.
2. Prepare a dielectric sheet by sintering a dielectric film laminated with an electrode where the dielectric film allows low-temperature-sintering.
3. Laminate the magnetic sheet and the dielectric sheet with glass paste as an intermediate layer comprising glass paste therebetween.
4. Fire the laminated sheets.

However, the following problems are found in this conventional composite component: (a) When firing the laminated sheets with the intermediate layer comprising glass paste therebetween, binder included in the glass paste is burnt to generate gas. This gas does not degas completely from the intermediate layer during the filing, and some voids remain in the intermediate layer after the firing. As a result, a high product reliability cannot be expected because of a wide dispersion in electric characteristics, etc. (b) A low-temperature-sintering material must be used both in a magnetic sheet and dielectric sheet, thus it is hard to gain high electric characteristics. (c) There is a too big difference between thermal expansion coefficients of the magnetic sheet and the dielectric sheet to match these two coefficients, and contractions of these two sheets in filing also much differ. Thus, a product of highly accuracy in dimension cannot be expected.

SUMMARY OF THE INVENTION

The present invention aims to provide a manufacturing method of a solid composite component having a high reliability as well as excellent characteristics.

The manufacturing method of the composite electronic component according to the present invention comprises the following steps: (a) Prepare a first functional substrate comprising a film ceramic substrate and a plurality of first functional members formed thereon, (b) Prepare a second functional substrate comprising a second ceramic substrate and a plurality of second functional members formed thereon, (c) Apply an intermediate layer comprising glass paste on a surface of at least one of the first and second functional substrates, (d) Debind each of the functional substrates independently on which the intermediate layer is applied, (e) Laminate the first and second functional substrates with the intermediate layer therebetween, (f) Fire the laminated substance in order to integrate the first and second functional substrates, (g) Cut the fired substance into pieces, and (h) Form an outer terminal on a side face of each piece.

According to the above manufacturing method, before the firing process, the debinding process which removes binder from the intermediate layer is provided to the functional substrate having the intermediate layer, therefore, gas generation in firing can be restrained, and thus few voids are produced. As a result, a highly reliable composite component can be produced. Since the functional members are formed on the ceramic substrate, materials of the functional members are not necessarily limited to low-temperature-sintering materials, and thus sintering material of excellent characteristics can be used. As a result, a composite component of excellent characteristics can be produced.

In the manufacturing method of the composite electronic component according to the present invention, at least one of the first and second functional substrates preferably have a plurality of through holes. Because little gas generated in firing degasses through these through holes, voids are prohibited almost perfectly from being generated.

The first functional member is preferably an inductor, and the second functional member is preferably a capacitor, whereby a highly reliable composite component having a filter function can be produced.

The first ceramic substrate preferably employs sintered magnetic substance, and the second ceramic substrate preferably employs sintered dielectric substance. Thus both of the ceramic substrates are made of sintered materials, whereby the thermal expansion coefficients of the two substances can be matched with ease and the contraction in firing becomes smaller. As a result, a composite component of highly accuracy in dimension can be produced.

Firing is preferably conducted in a temperature range of 500–700° C. Because residual heat stress becomes less in this comparatively low firing temperature, a composite component of better reliability can be produced.

The debinding process is preferably conducted in a temperature range of 400–500° C. in order to further reduce gas volume generated in firing.

BRIEF DESCRIPTION OF THE DRAWINGS

FIG. 2 depicts a magnetic substrate, FIG. 3 depicts a dielectric substrate, and FIG. 4 depicts an integrated state of the magnetic and dielectric substrates.

FIG. 5 depicts a dielectric substrate having through holes, and FIG. 6 depicts the composite component employing the dielectric substrate.

DESCRIPTION OF THE PREFERRED EMBODIMENTS

Exemplary Embodiment 1

Figure 1:
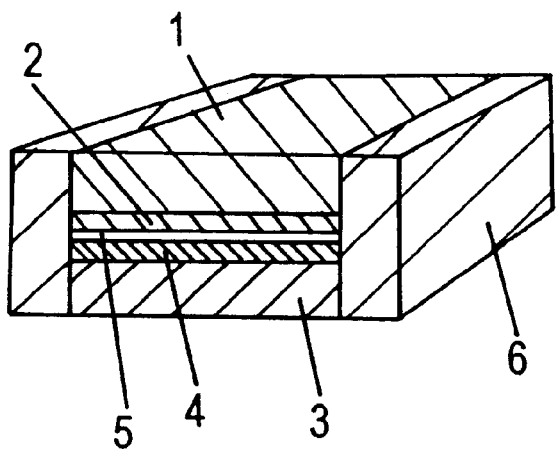
FIG. 1 is a perspective view of a composite component used in Exemplary Embodiment 1 of the present invention.

A chip-type composite component used in Exemplary Embodiment 1, as shown in FIG. 1, comprises (a) an inductor 2 formed on a ceramic substrate 1 made of magnetic substance glued to (b) a capacitor 4 formed on a ceramic substance 3 made of dielectric substance with (c) an intermediate layer 5 therebetween, and (d) an outer terminal 6 formed on one pair of opposite side faces of the glued body.

Figure 2:
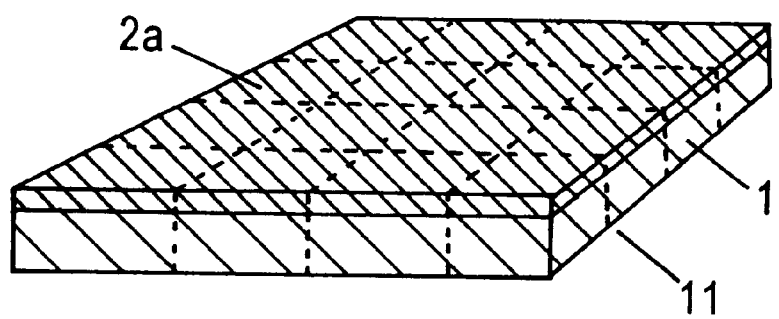
FIG. 2 through FIG. 4 illustrate a manufacturing method of the composite component shown in FIG. 1.
Figure 3:
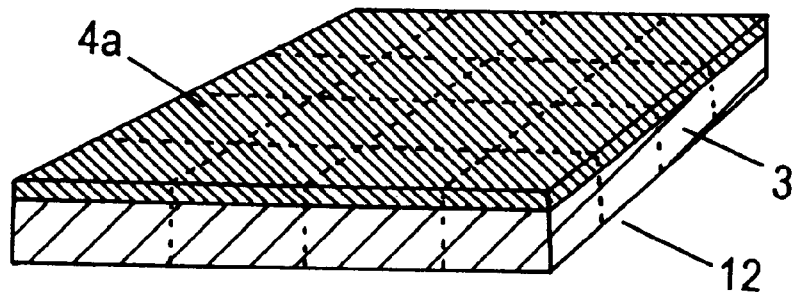

This composite component is manufactured in the following way: First, as shown in FIG. 2, by using techniques of film forming and sintering, form an inductor layer 2a on the ceramic substrate 1 made of magnetic substance sintered in a high temperature so that the inductor layer 2a may correspond to a plurality of inductors 2 which ale arranged at regular intervals, in order to prepare a functional substrate 11. As shown in FIG. 3, by using techniques of film forming and sintering, form capacitor layer 4a on the ceramic substrate 3 made of dielectric substance sintered in a high temperature so that the capacitor layer 4a may correspond to a plurality of capacitors 4 which are arranged at regular intervals, in order to prepare a functional substrate 12.

Figure 4:
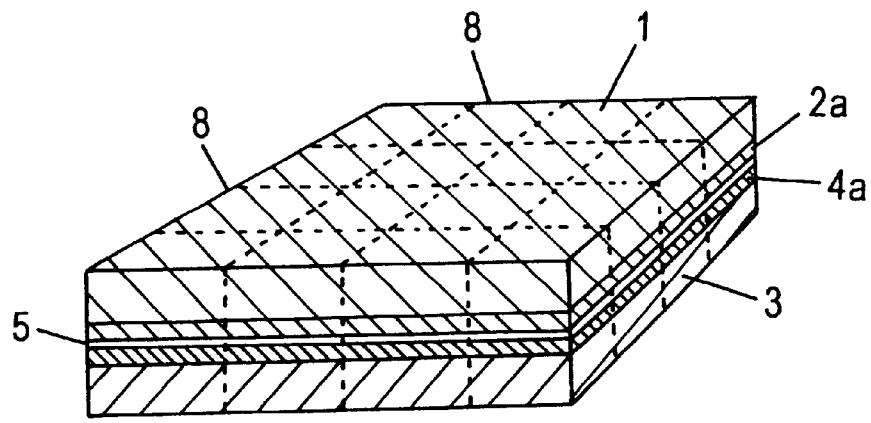

Second, print glass paste on the inductor layer 2a as well as the capacitor layer 4a in order to form the intermediate layer 5, then heat each substrate for providing a debinding process in a preferable temperature range of 400–500° C. After that, as shown in FIG. 4, laminate the inductor layer 2a and the capacitor layer 4a with the intermediate layer therebetween, and then fire this laminated body in a preferable temperature range of 500–700° C. A more preferable firing temperature range is 600–650° C. The glass paste comprises amorphous glass frit, binder such as ethyl cellulose, and solvent such as α terpineol added thereto.

Figure 7:
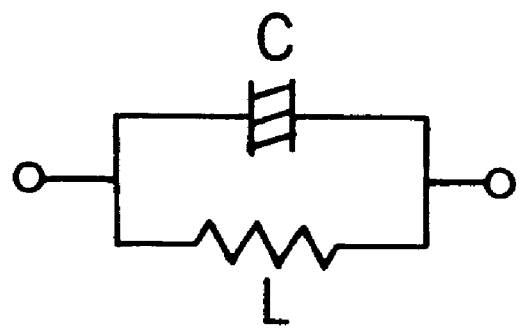
FIG. 7 is a circuit diagram of the composite component used in Exemplary Embodiment 1.

Third, cut an integrated body by scribing into pieces 8, then form an outer terminal 6 on a pair of opposite side faces so that the outer terminal may contact to an exposed conductor on the side face of each piece 8. The composite component is thus manufactured. In this composite component, the inductor 2 and capacitor 4 are connected in parallel by the outer terminal 6 so that a tank circuit shown in FIG. 7 may be composed.

In this exemplary embodiment, because the ceramic substrates 1 and 3 sintered in a high temperature are used as bases, the thermal expansion coefficients can be matched with ease, and the contraction in fixing becomes smaller. As a result, a composite component of a better accuracy in dimension can be manufactured. Also since it is not necessarily to use a low-temperature-sintering material higher electrical characteristics in the composite component than that in the conventional component such as sheet-laminated type or print-laminated type can be achieved with ease. Further, thanks to the debinding process provided before the firing process individually to the functional substrates 11 and 12 on which glass paste is applied, gas generation due to burning the binder in the filing process is restrained, whereby void occurrence is reduced.

Exemplary Embodiment 2

Figure 5:
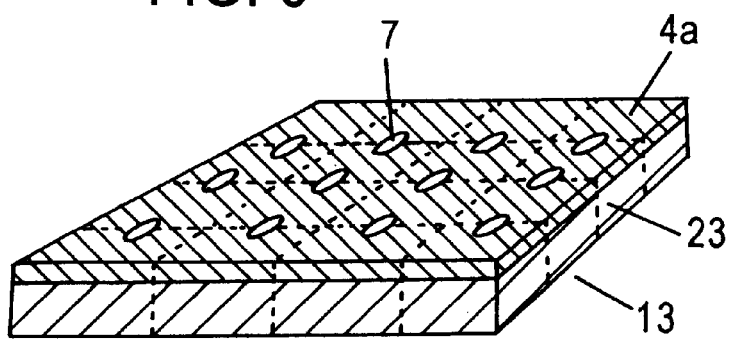
FIG. 5 and FIG. 6 illustrate a manufacturing method of a composite component used in Exemplary Embodiment 2.
Figure 8:
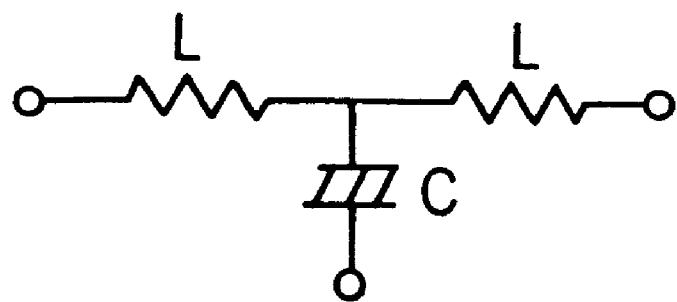
FIG. 8 is a circuit diagram of the composite component used in Exemplary Embodiment 2.

Exemplary Embodiment 2 differs from Exemplary Embodiment 1 in the following points: (a) Instead of the functional substrate 12 shown in FIG. 3, a functional substrate 13 having through holes 7 shown in FIG. 5 is used. (b) A circuit shown in FIG. 8 is composed by using these through holes 7. Other items remain same as those of Exemplary Embodiment 1. The following explanation is focused on different points.

First, as explained in the previous embodiment, prepare the functional substrate 11 on which the inductor layer 2a is formed. Also prepare the functional substrate 13 having through holes 7, by forming a capacitor layer 4a on a ceramic substrate 23 made of dielectric substance, which ceramic substrate 23 being sintered at a high temperature and having through holes, with techniques of film forming and sintering so that the capacitor layer 4a may correspond to a plurality of capacitors 4 arranged at regular intervals.

Figure 6:
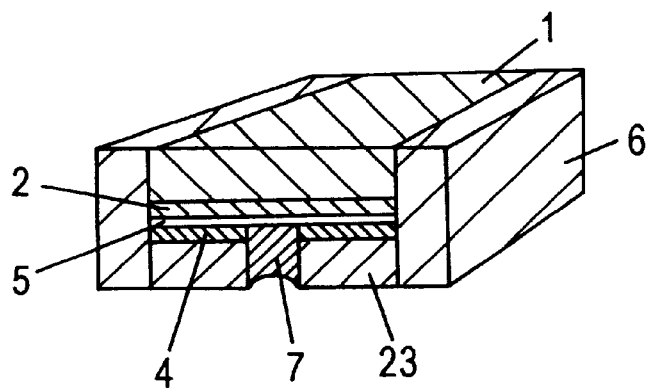

Second, as explained in the previous embodiment, a composite component shown in FIG. 6 is manufactured after the processes of applying the intermediate layer 5 between the functional substrates 11 and 13, debinding, laminating the functional substrates 11 and 13, filing, cutting, and forming the outer terminal. In this composite component, a first terminal of the inductor 2 is coupled to the outer terminal 6, and a second terminal thereof is coupled to a first electrode of the capacitor 4 internally, further, a second electrode thereof is coupled to the outer terminal 6, thus a low-pass-filter circuit shown in FIG. 8 is formed.

In Exemplary Embodiment 2, since a plurality of through holes 7 are provided on the functional substrate 13, gas generated in firing is easily degassed, whereby void occurrence is almost perfectly prohibited. Further, some surplus glass paste flows into the through holes 7, thereby a thickness of the intermediate layer becomes more uniform. As a result, a gluing reliability between the functional substrates 11 and 13 is increased. A conductor is provided into the through holes 7, whereby the conductor can be used as another outer terminal. As a result, a structure as well as a manufacturing process of the composite component can be simplified.

In Exemplary Embodiment 2, the through holes 7 are provided only to the functional substrate 13; however, the through holes 7 may be provided only to the functional substrate 11, or may be provided to both the substrates 11 and 13.

The present invention is not limited to the above exemplary embodiments, and various modifications are available, e.g. the intermediate layers made of glass paste are formed on both upper and lower functional substrates; however, the intermediate substrate may be formed either one of functional substrates. Accordingly, various modification may be made in the details within the scope and range of equivalents of the claims and without departing from the spirit of the invention.

What is claimed is:

1. A manufacturing method of a composite electronic component comprising the steps of:
   (a) preparing a first functional substrate comprising a plurality of first functional members formed on a first ceramic substrate,
   (b) preparing a second functional substrate comprising a plurality of second functional members formed on a second ceramic substrate, (c) applying an intermediate layer on a surface of at least one of said first and second functional substrates, (d) independently debinding each functional substrate on which the intermediate layer has been applied, (e) laminating said first and second functional substrates with said intermediate layer therebetween into a laminated body, (f) firing said laminated body in order to integrate said first and second functional substrates into a fired body, (g) cutting said fired body into pieces, and (h) forming an outer terminal on a side face of said pieces.

2. The manufacturing method of the composite electronic component according to claim 1, wherein at least one of said first and second functional substrates has a plurality of through holes.

3. The manufacturing method of the composite electronic component according to claim 1, wherein said first functional member is an inductor and said second functional member is a capacitor.

4. The manufacturing method of the composite electronic component according to claim 1, wherein said first ceramic substrate comprises sintered magnetic substance and said second ceramic substrate comprises sintered dielectric substance.

5. The manufacturing method of the composite electronic component according to claim 1, wherein the process of filing is conducted in a firing-temperature range of 500–700° C.

6. The manufacturing method of the composite electronic component according to claim 1, wherein the process of debinding is conducted in a heating-temperature of 400–500° C.

* * * * *